March 25, 1941.  C. F. BIERBACH  2,236,490
DIRECTION INDICATING DEVICE FOR MOTOR VEHICLES
Filed Aug. 10, 1940  2 Sheets—Sheet 1
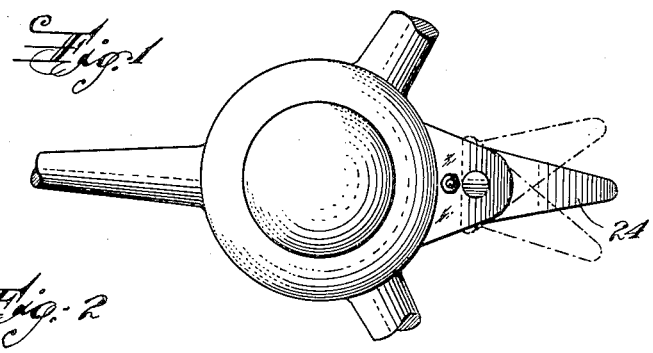
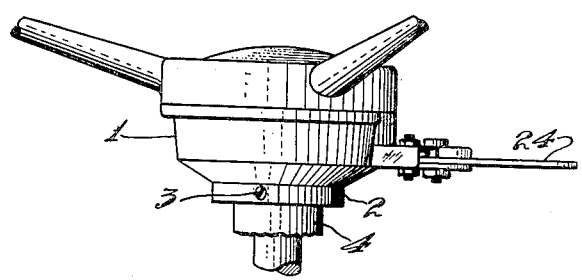
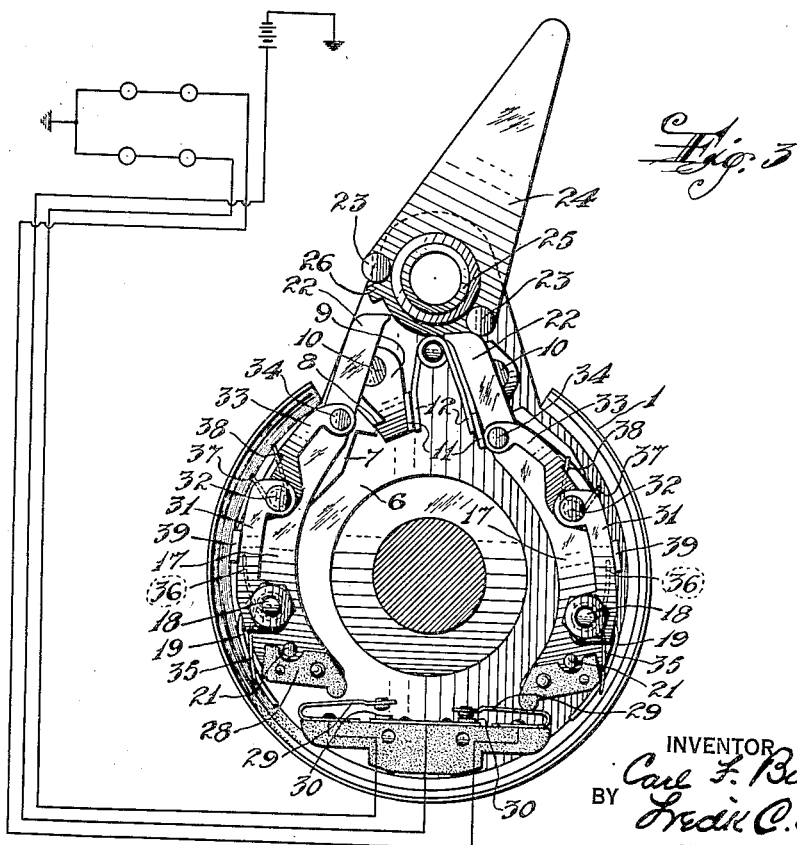
INVENTOR
Carl F. Bierbach,
BY Fredk C. Fischer
ATTORNEY March 25, 1941.     C. F. BIERBACH     2,236,490
DIRECTION INDICATING DEVICE FOR MOTOR VEHICLES
Filed Aug. 10, 1940     2 Sheets-Sheet 2
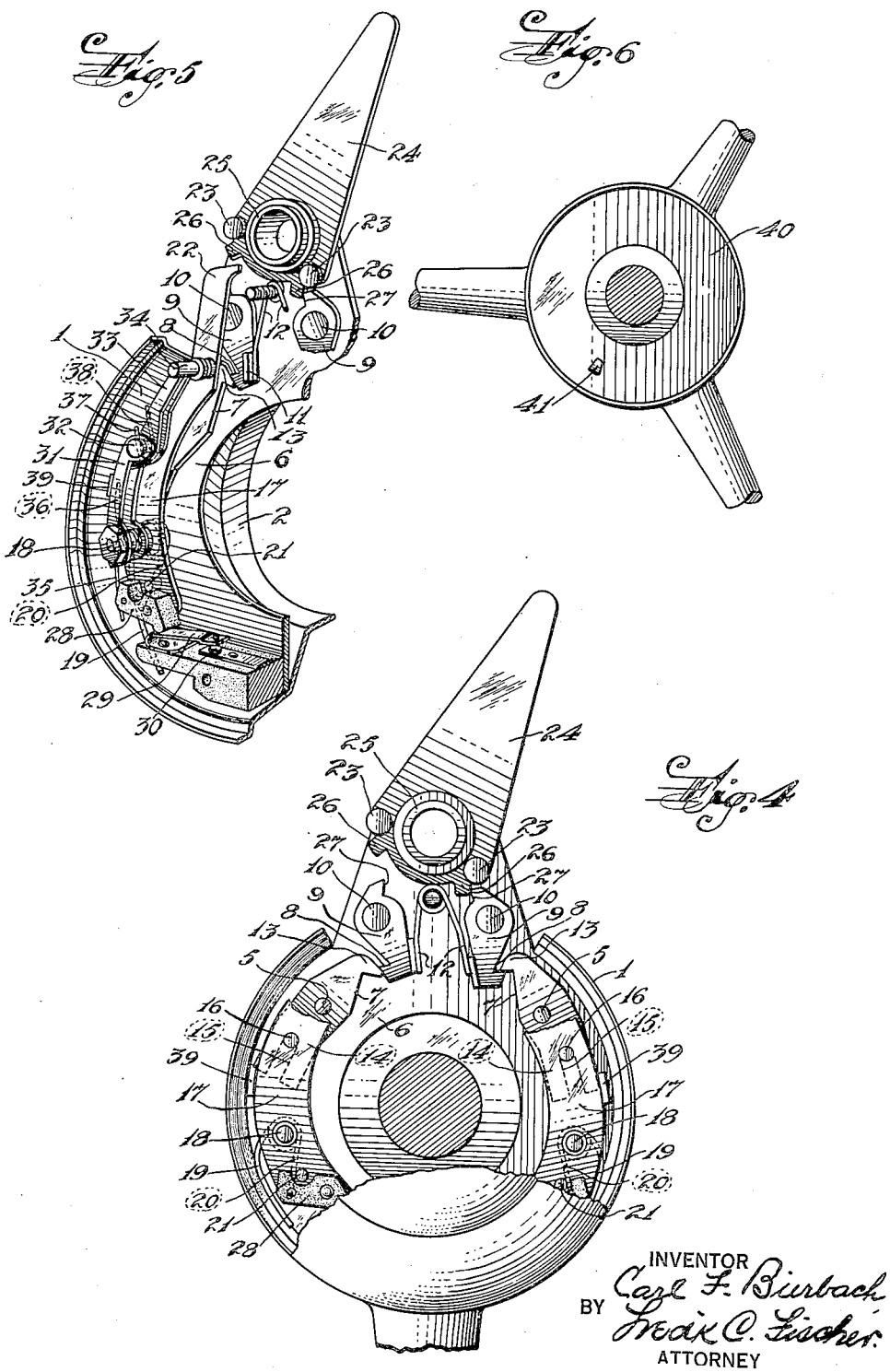
INVENTOR
Carl F. Bierbach
BY Fredk C. Fischer
ATTORNEY Patented Mar. 25, 1941

2,236,490

UNITED STATES PATENT OFFICE 2,236,490

DIRECTION INDICATING DEVICE FOR MOTOR VEHICLES

Carl F. Bierbach, Newark, N. J., assignor to A. D. S. Corp., Newark, N. J., a corporation of New Jersey Application August 10, 1940, Serial No. 352,124

6 Claims. (Cl. 200—59)

This invention relates to signalling devices for motor vehicles and more particularly to improvements for indicating the direction in which the motor vehicle is to be turned.

With closed automobiles and large trucks, it is often difficult and inconvenient for the driver to indicate to drivers of following and approaching vehicles, the direction in which the vehicle is to be turned. This is especially true in the winter time when it is necessary to keep the windows closed. Also, trucks are now built of such a size that it is impractical for the driver to extend his hand beyond the side walls of the truck to indicate a turn.

It is, therefore, an object of this invention to provide a device positioned on the steering post adjacent the steering wheel within easy reach of the hands of the driver of the motor vehicle, for indicating the direction in which the vehicle is to be turned. The device is preferably mounted on the steering post beneath the steering wheel, and provided with a single handle which can be readily and conveniently manipulated by the fingers of the driver without necessitating the removal of the hand from the steering wheel.

A further object is the provision of a direction indicating device for motor vehicles, which device is simple in structure and positive in operation, and will not readily get out of order no matter how frequently it may be used.

A further object is the provision in a direction indicating device for motor vehicles, of means for automatically returning the parts of the device to a neutral position after the motor vehicle has made the desired turn indicated by the device, and again straightened out.

A further object is the provision of an indicating device which can be readily and conveniently installed on any type of motor vehicle without material alteration.

These and other advantageous objects, which will later appear, are accomplished by the simple and practical construction and arrangement of parts hereinafter described and exhibited in the accompanying drawings, forming part hereof, and in which:

Fig. 1 is a plan view of a portion of a steering wheel associated with a device embodying the invention, Fig. 2 is an elevational view of the device shown in Fig. 1, Fig. 3 is a plan view of the control device with the cover removed, Fig. 4 is a plan view of the control device with the steering wheel removed and part of the cover broken away, Fig. 5 is a perspective view, partly in section, of one side of the device, and Fig. 6 is a bottom view of a steering wheel used in connection with the device.

Referring to the drawings, the indicating device is shown to comprise a casing 1 having a collar portion 2 on the underside thereof, which is attached by means of set screws 3 or similar means to a steering column 4 of an automobile.

Referring to Figs. 3, 4, 5, pivotally mounted at 5, on a plate 6, in the casing, on each side thereof are levers 7. The structure on each side of the casing being the same, only one side will be described.

The lever 7 has one end thereof adapted to engage a shoulder 8 of a lever 9, pivoted at 10 to the plate 6, the lever 9 having an upstanding boss 11 which engages a spring 12, the spring tending normally to force the lever 9 towards the end 13 of lever 7. The other end 14 of lever 7 is forked at 15 and embraces a pin 16 (see Fig. 4) on a lever 17, which is pivotally mounted at 18 on the plate 6.

A torsion spring encircles the pivot pin 18 for lever 17, the spring having one end 19 engaging the inner wall of casing 1 and the other end 20 engaging a pin 21 on lever 17, so that lever 17 is normally urged towards the wall of the casing.

Lever 17 has one end 22 extending to a point adjacent lever 9, where the end 22 is rounded and positioned to be engaged by a round pin 23 on a handle 24 pivotally mounted at 25 to plate 6. The handle 24 has a lug 26 adapted to engage a shoulder 27 on lever 9.

The other end of lever 17, near the pivot 18, carries a small block 28 of insulating material which is adapted to press a spring contact 29 into engagement with a contact 30 mounted on a block of insulating material. The contacts 29 and 30 when in engagement close an electrical circuit through an indicating lamp (not shown) on one side of an automobile.

Mounted on the pivot pin 18 is a small channelled lever 31 to which is pivotally connected at 32 a similar channelled lever 33, having projecting upwardly from the free end thereof a pin 34. A torsion spring encircles pivot pin 18 at one end 35, engaging the inner wall of casing 1, the other end 36 engaging the inner wall of channelled member 31. A torsion spring encircles the pivot pin 32 and has one end 37 engaging the end of lever 31 and the other end 38 engaging a shoulder on lever 33. The lever 17 is provided with an upstanding shoulder 39 which engages lever 31 to move the latter inwardly against the action of spring 35.

In operation, should it be desired, for example, to indicate a right turn, the handle 24 would be moved clockwise as shown in Fig. 3, which will cause pin 23 to bear against the rounded portion of the end 22 of lever 17 which moves the lever 17 inwardly against the action of the torsion spring encircling the pivot pin 18. Inward movement of lever 17 causes the small block of insulating material to bear against the spring contact 29 to cause the latter to engage contact 30 and close an electrical circuit through an indicating lamp on the right hand side of the automobile. When lever 17 is moved inwardly, pin 16 thereon bears against the forked end 15 of the lever 7 and rotates the latter clockwise as shown on the right hand side of Fig. 4 so that the nose 13 of lever 7 will engage the shoulder 8 of the lever 9 to latch the various levers into a position to maintain the electrical circuit through the indicating lamps. The spring 12 tends to hold shoulder 8 positively in engagement with nose 13 of lever 7. At the same time, lug 26 engages shoulder 27 on lever 9, so that should it be desired to return the parts to their normal non-indicating positions, handle 24 will be moved counter-clockwise, from the position shown in Fig. 4, to cause lug 26 to bear against shoulder 27 and move latching shoulder 8 from engagement with nose 13 against the action of spring 12.

Mounted on the underside of the steering wheel 40 is a downwardly projecting pin 41 which is adapted to engage a pin 34 at the end of lever 33. As long as the automobile is being turned in the direction indicated, the pin 41 will pass freely over pin 34 against the action of torsion spring 37—38. However, when the steering wheel is turned to cause the driving wheels to move in a straight line, pin 41 will move pin 34 inwardly and engage shoulder 11 to move shoulder 8 from engagement with nose 13 against the action of spring 12 to unlatch the parts, and allow them to be returned to their normal non-indicating positions by the various springs associated therewith.

The various parts are mounted upon plate 6 and can be readily removed from the casing when desired. This facilitates the assembly and enables the device to be used conveniently upon steering posts of different diameters without requiring alteration.

The foregoing disclosure is to be regarded as descriptive and illustrative only, and not as restrictive or limitative of the invention, of which, obviously, embodiments may be constructed, including many modifications, without departing from the spirit and scope of the invention herein set forth and denoted in the appended claims.

Having thus described my invention, what I claim as new and desire to secure by Letters Patent, is:

1. In a direction indicating device for motor vehicles, a casing adapted to be mounted upon a steering column, a plate mounted in said casing, a first lever mounted on said plate and having means thereon for closing an electrical circuit, said first lever having one end thereof rounded, a handle pivotally mounted on said plate and having a pin adapted to engage said rounded end of the first lever to move the latter to a predetermined position, a second lever pivotally connected to the first lever, spring controlled latching means for holding said second lever when said first and second levers have been moved by said handle, a third lever pivotally mounted above the first lever, said first lever having a shoulder thereon adapted to engage the third lever, a fourth lever pivotally connected to the third lever and positioned above said second lever, a pin at the extremity of the fourth lever, a steering wheel having a projection extending downwardly from the underside thereof adapted to engage said pin, said projection passing freely over the pin during the turning of the vehicle and engaging said pin to cause said pin to release the latching means when the steering wheel is turned to straighten out the guide wheels of the vehicle, and spring means to return said levers to their normal positions when the guide wheels have been straightened out.

2. In a direction indicating device for motor vehicles, a casing adapted to be mounted upon a steering column, a plate mounted in said casing, a first lever mounted on said plate and having means thereon for closing an electrical circuit, said first lever having one end thereof rounded, a handle pivotally mounted on said plate and having a pin adapted to engage said rounded end of the first lever to move the latter to a predetermined position, a second lever pivotally connected to the first lever, spring controlled latching means for holding said second lever when said first and second levers have been moved by said handle, a third lever pivotally mounted above the first lever, said first lever having a shoulder thereon adapted to engage the third lever, a fourth lever pivotally connected to the third lever and positioned above said second lever, a pin at the extremity of the fourth lever, a steering wheel having a projection extending downwardly from the underside thereof adapted to engage said pin, said projection passing freely over the pin during the turning of the vehicle and engaging said pin to cause said pin to release the latching means when the steering wheel is turned to straighten out the guide wheels of the vehicle, and spring means to return said levers to their normal positions when the guide wheels have been straightened out, and a lug on said handle adapted to engage and release said latching means when desired.

3. In a direction indicating device for motor vehicles, a casing adapted to be mounted upon a steering column, a plate mounted in said casing, a lever pivotally mounted on said plate and having means thereon for closing an electrical circuit, a handle pivoted on said plate and having a rounded pin to engage said lever to move the latter to a circuit closing position, spring controlled latching means for holding said lever in a circuit closing position, a lug on said handle adapted to release said latching means, and spring means to return said lever to its initial position.

4. In a direction indicating device for motor vehicles, a casing adapted to be mounted upon a steering column, a plate mounted in said casing, a first lever pivotally mounted on said plate and having means thereon for closing an electrical circuit, said first lever having one end thereof rounded, a handle pivotally mounted on said plate and having a rounded end adapted to engage and move said first lever to a position to close an electrical circuit, a second lever pivotally mounted on said plate and having a forked end, a pin on the first lever engaging the forked end of said second lever to move the latter, a latching lever having a shoulder thereon, spring means normally urging the shoulder of said latching lever into engagement with said second lever to hold said first and second levers in predetermined positions, and a lug on said handle adapted to engage the latching lever to release said levers.

5. In a direction indicating device for motor vehicles, a casing adapted to be mounted upon a steering column, a plate mounted in said casing, a lever pivotally mounted on said plate, and having an end thereof extending out of the casing, a handle pivotally mounted on said plate and provided with a rounded pin engaging the outwardly extending portion of said lever, means on said lever to close an electrical circuit, latching means to hold the lever in a circuit closing position, means on said handle to release said latching means, and spring means to return the lever to its initial position.

6. In a direction indicating device for motor vehicles, a casing adapted to be mounted upon a steering column, a plate mounted in said casing, a lever pivotally mounted on said plate and having means thereon to close an electrical circuit, a second lever adapted to be moved by said first lever, a third lever pivoted on said plate and having a shoulder thereon, spring means normally urging said shoulder into engagement with said second lever to hold the latter in a latched position, a handle pivoted on said plate and engaging the first lever to move the latter to a circuit closing position, a lug on said handle adapted to engage the third lever to move the shoulder from engagement with the second lever, and spring means to move said levers to their initial positions.

CARL F. BIERBACH.